US008001542B2

(12) United States Patent
Edwards et al.

(10) Patent No.: US 8,001,542 B2
(45) Date of Patent: Aug. 16, 2011

(54) SELF-INSTALLING SOFTWARE COMPONENTS FOR NETWORK SERVICE EXECUTION

(75) Inventors: Warren Keith Edwards, San Francisco, CA (US); Mark Webster Newman, San Francisco, CA (US); Trevor Smith, San Francisco, CA (US); Jana Zdlslava Sedivy, Palo Alto, CA (US)

(73) Assignee: Xerox Corporation, Norwalk, CT (US)

( * ) Notice: Subject to any disclaimer, the term of this patent is extended or adjusted under 35 U.S.C. 154(b) by 1322 days.

(21) Appl. No.: 10/736,290

(22) Filed: Dec. 12, 2003

(65) Prior Publication Data

US 2005/0132354 A1    Jun. 16, 2005

(51) Int. Cl.
*G06F 9/445* (2006.01)
(52) U.S. Cl. ........................................ 717/176; 717/171
(58) Field of Classification Search ........... 717/168–178
See application file for complete search history.

(56) References Cited

U.S. PATENT DOCUMENTS

| | | | |
|---|---|---|---|
| 6,219,787 B1 * | 4/2001 | Brewer | 713/167 |
| 6,289,512 B1 * | 9/2001 | Edwards et al. | 717/178 |
| 6,546,554 B1 * | 4/2003 | Schmidt et al. | 717/176 |
| 6,910,128 B1 * | 6/2005 | Skibbie et al. | 713/170 |
| 7,155,487 B2 * | 12/2006 | Yau et al. | 709/213 |
| 7,240,107 B2 * | 7/2007 | Chase-Salerno et al. | 709/222 |
| 2001/0056462 A1 | 12/2001 | Kataoka | |

FOREIGN PATENT DOCUMENTS

| | | |
|---|---|---|
| EP | 1 315 088 | 5/2003 |
| WO | WO 02/089382 | 11/2002 |

OTHER PUBLICATIONS

The Common Object Request Broker and Specification, OMG, Revision 2.0 Jul. 1996, Whole Manual.*
Black J. A. et al, "Speakeasy: A Platform for Interactive Public Displays," ACM Conf. on Computer-Supported Cooperative Work (CSCW 2002), New Orleans, LA, Nov. 16, 2002.

* cited by examiner

*Primary Examiner* — Lewis A Bullock, Jr.
*Assistant Examiner* — Michael Yaary
(74) *Attorney, Agent, or Firm* — Patrick J. S. Inouye; Krista A. Wittman

(57) ABSTRACT

A system and method for providing self-installing software components for network service execution is presented. A basic communication framework is established with a service host system executing a network service software component to provide a network service. Availability of the network service software component is determined and prerequisites against a runtime environment are verified through the service host system. A code bundle providing the network service software component through the service host system logically grouped with installation instructions for the network service software component is executed.

22 Claims, 10 Drawing Sheets

```
60
                         61
Public interface SpeakeasyComponent{
        public boolean providesServiceInstaller();
        public PredicateObject verifyClientEnvironment();        62
        public InstallableCodeBundle getServiceInstaller():
        public boolean codeUpdateRequired(String versionDescriptor);
}
```

SELF-INSTALLING SOFTWARE COMPONENTS FOR NETWORK SERVICE EXECUTION

FIELD

This application relates in general to software component installation and, in particular, to a system and method for providing self-installing software components for network service execution.

BACKGROUND

With the widespread acceptance of the Internet as a communications and data exchange medium, a wide range of network services have become increasingly available. Network services refer to a class of host-based services that can be accessed across a network, including the Internet, to provide distributed or remote functionality, such as file services, Web applications and so forth. Generally, individual users access network services from a requesting system, often termed a client system, remotely interfaced to a service host system that executes the network service on behalf of the requesting system.

The use of a network service is distinct from the execution of that network service. Service host systems provide network service functionality to requesting client systems. However, each client system must first install the network service to provide the same network service functionality locally. For example, Web logs provide on-line diaries that are centrally hosted and are publicly-accessible by client systems. To run a local Web log on a client system, a user would first have to install the software necessary to run the network service.

Unfortunately, the end-to-end process of network services software installation is also an activity orthogonal to the use of the network service itself. A typical software installation requires the user to successfully complete several sets of independent but related activities. First, the user must know that installation software is required. One difficulty is that the name, type and nature of such software may not be readily apparent based on the network services. As well, suitable installation software might be available in different types and forms.

Second, the user must obtain a copy of the installation software. Generally, new application programs, hardware and peripherals either provide the installation software with distribution media or through on-line download. Obtaining a copy of the installation software for network services, though, can potentially present problems. The goal is to install the software necessary to run a network service locally, which may incorrectly assume that the user knows where to get the necessary software. The installation software could be an application program or might be available through download on-line via a server operating in conjunction with or independently from the service host system. Whatever the source, the user is required to identify, hunt down and obtain a copy of the required installation software.

Third, the user must determine whether any prerequisites necessary to the execution of the network service, plus to run the installation software, are met. The full set of all software installed on a computer system defines a runtime environment against which any new software must first be matched. However, the existing software, including the operating system, can differ from computer system to computer system, including type, version, and patch level, to name just a few distinctions. Each distinction must first be considered prior to installing any new software. As a result, the user can proceed with the installation only after first satisfying any prerequisites, which can include repeating the previous steps of knowing that further installation software is required and getting copies.

Finally, during and possibly following installation, the user may need to check whether the software requires updating. Updating software can be tedious if support is provided separately from the source from which the copy of the software was obtained. In addition, updates might be available in alternative forms relative to the installation software, such as being provided only on-line.

Conventionally, installation software and updates are made available as resources separate from the network service. On-line updates are becoming increasingly available, such as provided through the Windows Update mechanism, provided by Microsoft Corporation, Redmond, Wash., the disclosure of which is incorporated by reference. However, the mechanism requires the user to connect to a Web site, which then evaluates the runtime environment. Based on a list generated by the Web site, the user can select and download updates for supported software from a server for local installation. However, the updating is performed as an orthogonal process separate from the use of the software.

Therefore, there is a need for an approach to facilitating software installation for executing network services locally by closely associating the installation software with the network service itself. Preferably, such an approach would provide both the installation and network service software together.

SUMMARY

An embodiment provides a system and method for providing self-installing software components for network service execution. A basic communication framework is established with a service host system executing a network service software component to provide a network service. Availability of the network service software component is determined and prerequisites against a runtime environment are verified through the service host system. A code bundle providing the network service software component through the service host system logically grouped with installation instructions for the network service software component is executed.

Still other embodiments of the invention will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the invention. Accordingly, the drawings and detailed description are to be regarded as illustrative in nature and not as restrictive.

DETAILED DESCRIPTION

System Overview

Figure 1:
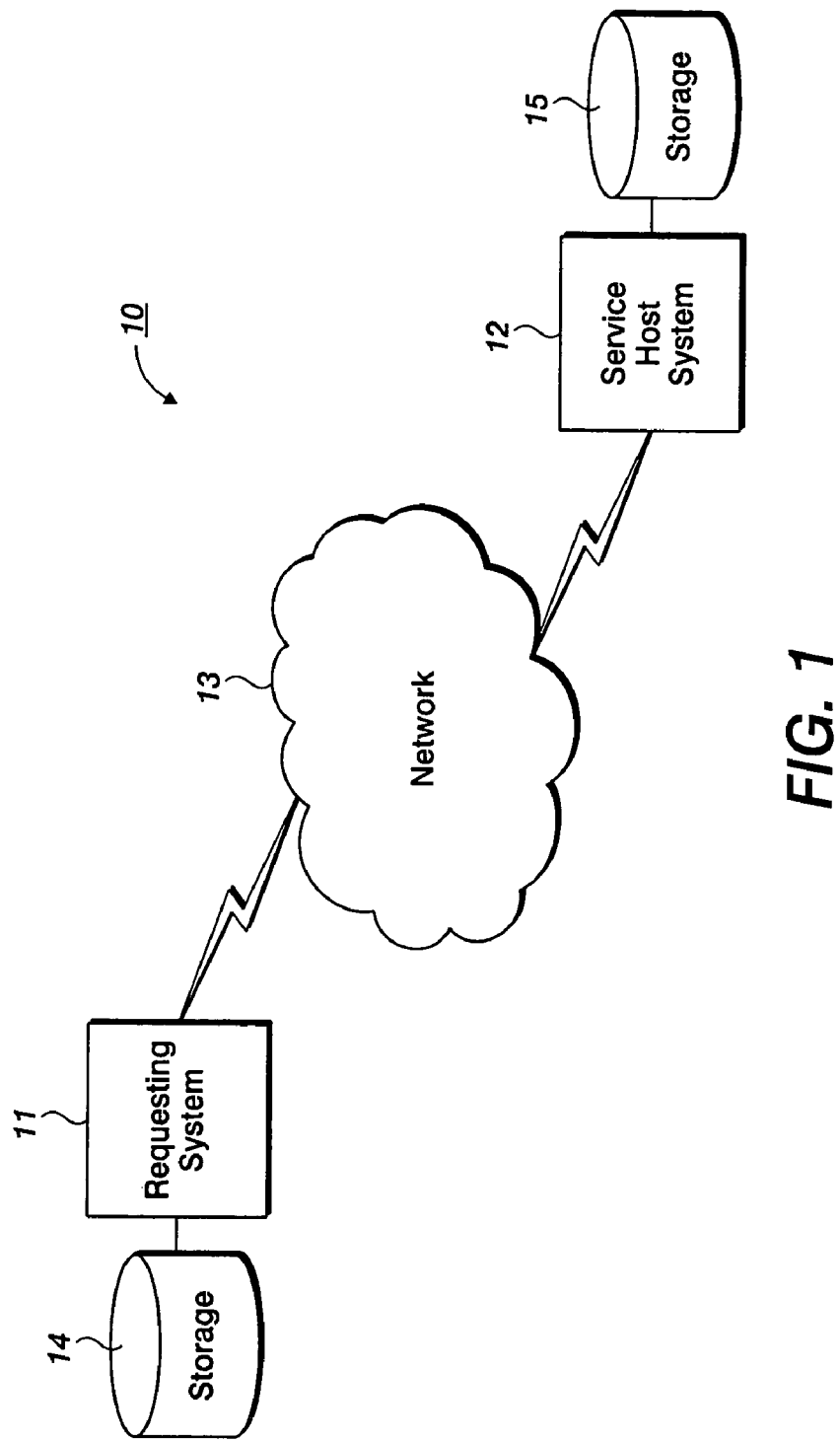
FIG. 1 is a block diagram showing a system for providing self-installing software components for network service execution, in accordance with an embodiment.

FIG. 1 is a block diagram showing a system 10 for providing self-installing software components for network service execution, in accordance with an embodiment. The system 10 includes one or more individual computer systems 11, 12 that can vary in terms of hardware, peripherals, and software components, including operating systems, drivers and support software, network and remote services, and applications. In addition, the versions and patch levels of the software components can also vary. The computer systems 11, 12 are interconnected over a network, such as the Internet. The network 10 can include local area and wide area networks provided in various topologies, configurations, and arrangements of components arranged to interoperatively couple with various other networks and include, without limitation, conventionally wired, wireless, satellite, optical, and equivalent network technologies, as will be appreciated by one skilled in the art.

Software components for executing network services locally are installed through lightweight, serendipitous interactions between a requesting system 11 and a service host system 12, as further described below with reference to FIG. 2. Briefly, the service host system 12 is the system hosting the network service that a user intends to install and execute locally on the requesting system 11. The requesting system 11 identifies the service host system 12 as a source of software necessary to install and execute the network service locally. The requesting system 11 confirms that the service host system 12 can provide the network service software and, with the assistance of the service host system 12, verifies that the runtime environment meets any prerequisites of the network service software. Upon successful verification, the requesting system 11 downloads and installs the network service software either by requestor management or with an installation helper. Following installation, the network service software is updated if required.

Both the requesting system 11 and service host system 12 preferably execute a managed code platform, such as the Java operating environment, licensed by Sun Microsystems, Inc., Palo, Alto, Calif., which provides a machine-independent and architecture-neutral operating environment. The managed code platforms also provide a basic communications framework over which the requesting system 11 and the service host system 12 can execute a lightweight request-and-response protocol through which runtime environment verification, software installation and, if necessary, software updating, can be affected, as further described below with reference to FIG. 5.

In a further embodiment, one or both of the requesting system 11 and service host system 12 directly execute the installation software and network services as programs written to execute in a specific runtime environment. For example, the installation software and network services could be provided as platform-specific "native" code designed to run in a particular operating environment, such as the Windows operating environment, licensed by Microsoft Corporation, Redmond, Wash. Other forms of platform-specific native code, including declarative code, are possible.

The individual computer systems, including requesting system 11 and service host system 12, include general purpose, programmed digital computing devices including a central processing unit, random access memory, non-volatile secondary storage 14, 15, such as a hard drive or CD ROM drive, network or wireless interfaces, and peripheral devices, including user interfacing means, such as a keyboard and display. Program code, including software programs, and data is loaded into the RAM for execution and processing by the CPU and results are generated for display, output, transmittal, or storage.

Service Host System

Figure 2:
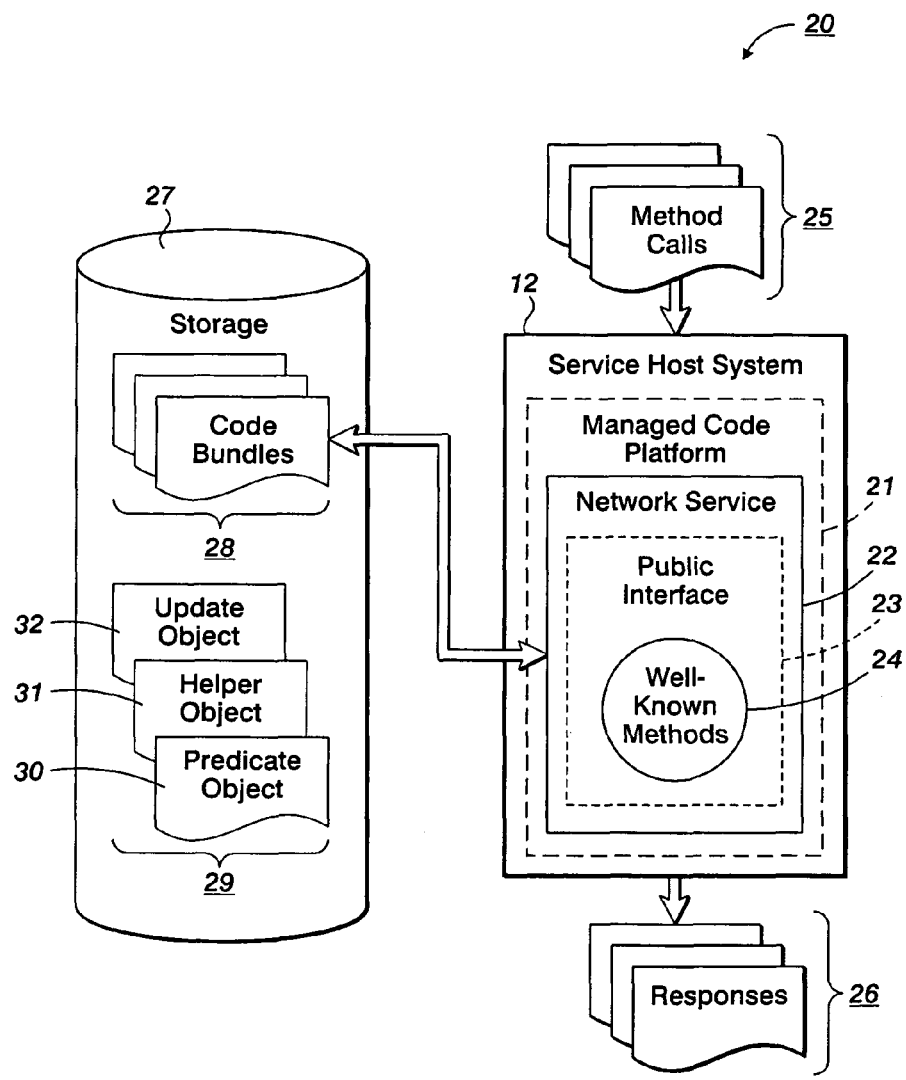
FIG. 2 is a functional block diagram showing the service host system of FIG. 1.

FIG. 2 is a functional block diagram 20 showing the service host system 12 of FIG. 1. The service host system 12 executes a network service 22 that provides distributed or remote functionality to requesting systems 11. In one embodiment, the service host system 12 executes a managed code platform 21. The managed code platform 21 can include programming language compilers and interpreters (not shown) executed by the underlying operating system (not shown) to provide a virtual runtime environment within which the network service 22 executes. In a further embodiment, the service host system 12 directly executes platform-specific applications, including the network service 22. Other types of applications or services implemented in software for execution under or independent of the managed code platform 21 are possible.

The service host system 12 provides a standard mechanism for a requesting system 11 that is a client system to download, install and update code for providing the equivalent functionality of the network service 22 on that requesting system 11 locally. The standard mechanism includes a public interface 23 provided by the service host system 12 and a set of well-known methods 24 invoked through method calls 25 from a requesting system 11 on the public interface 24, as further described below with reference to FIG. 4. The network service 22 implements the well-known methods 24 to ensure that any system requesting a copy of that network service 22 is able to proceed through the installation and updating processes without having to identify or seek the constituent components for the network service software from another source. However, the service host system 12 need not function as the source of any prerequisite components that may also be needed by a requesting system 11. The service host system 12 only need assist the requesting system 11 in identifying whether the prerequisites for the network service 22 are met and could, but need not, facilitate satisfying those prerequisites.

The service host system 12 stores both the software for the network service 22 and the installation software as a set of logically grouped components, which appear to the requesting system 11 as a single unified code bundle. The actual network service software is stored in a code bundle 28 and the installation software is stored in a set of objects 29, which include an installation predicate object 30, helper object 31, and update object 32, in a storage 27.

Requesting System

Figures 3, 4:
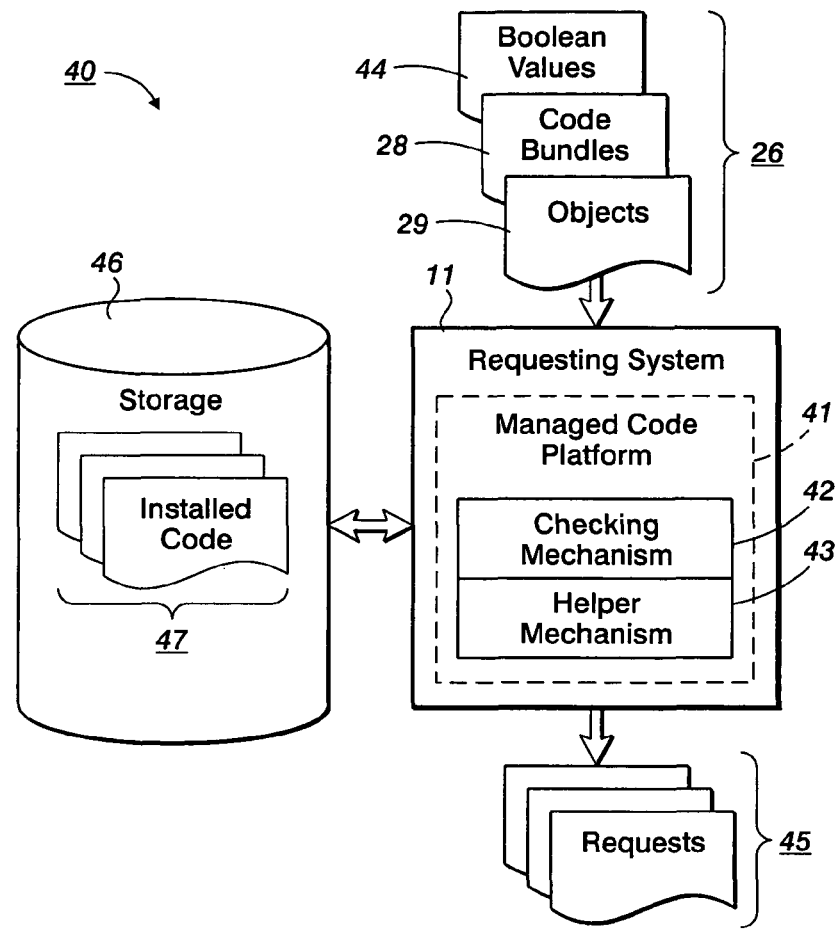
FIG. 3 is a functional block diagram showing the requesting system of FIG. 2.
FIG. 4 is a data structure diagram showing, by way of example, the public interface provided to a requesting client by the service host system of FIG. 2.

FIG. 3 is a functional block diagram 40 showing the requesting system 11 of FIG. 2. The requesting system 11 sends requests 45 to a service host system 12 and receives back responses 26, which can include Boolean values 44, one or more code bundles 28, and the objects 29. The requesting system 11 executes a checking mechanism 43 and, optionally, a helper mechanism 43. The checking mechanism 42 executes installation predicate objects 30 and update objects 32 received from the service host system 12. The helper mechanism 43 executes helper objects 31 also received from the service host system 12. In one embodiment, the requesting system 11 executes a managed code platform 41 to provide a virtual runtime environment within which the checking mechanism 42 and, optionally, the helper mechanism 43 execute. In a further embodiment, the service host system 12 directly executes platform-specific applications, including the checking mechanism 42 and, optionally, the helper mechanism 43. Other types of applications or services implemented in software for execution under or independent of the managed code platform 41 are possible.

The requesting system 11 installs software components by invoking the well-known methods 24 through the public interface 23 provided by the service host system, as further described below beginning with reference to FIG. 6. The requesting system 11 identifies desired installable software, such as an network service 22, by locating or serendipitously encountering a requesting system 11 upon which the network service software exists. The installable software could be either a client or service, depending upon the environment. The requesting system 11 sends an availability request 45 to the service host system 12 and, if the network service software is available, proceeds to verify the runtime environment. The checking mechanism 42 executes an installation predicate object 30 to verify that the runtime environment has all the necessary prerequisites for installing and running the network service.

In the described embodiment, the installation predicate object 30 is implemented as mobile code for execution within the managed code platform 41 to test any aspect of the requesting system 11, such as hardware, peripherals, and software components, including operating systems, drivers and support software, network and remote services, and applications, plus the versions and patch levels of the software components. In a further embodiment, the installation predicate object 30 could be implemented in platform-specific native code written using, for instance, a declarative syntax specifying a list of required software components necessary for the installation to proceed. If the requesting system 11 fails to meet the prerequisites, the installation predicate object 30 generates a list of required components, which must be independently satisfied before proceeding further with the actual installation.

Once all of the prerequisites have been identified, the requesting system 11 sends a code request 45 to the service host system 12 and receives a code bundle 28 containing the network service software, which is stored in a storage 46 as installed code 47. The user must first satisfy any outstanding prerequisites before manually proceeding with the installation of the network service software. Alternatively, the installation steps can be delegated to the helper mechanism 43 to satisfy any outstanding prerequisites and to perform the installation on behalf of the user. If delegated, the helper mechanism 43 executes a helper object 31 to locate and obtain copies of any software components necessary to satisfy the prerequisites. As necessary, the runtime environment is again verified against each of the prerequisites. Each of the prerequisites is then installed, followed by the installation of the network service software. In the described embodiment, the helper object 31 is implemented as mobile code for execution within the managed code platform 41. In a further embodiment, the helper object 31 could be implemented in platform-specific native code written using, for instance, a declarative syntax.

Following successful installation, the requesting system 11 sends an update request 45 to the service host system 12 and, if required, proceeds to update the network service software. The checking mechanism 42 executes an update object 32 to identify, retrieve and install any necessary updates. In the described embodiment, the update object 32 is implemented as mobile code for execution within the managed code platform 41. In a further embodiment, the update object 32 could be implemented in platform-specific native code written using, for instance, a declarative syntax.

Preferably, the requesting system 11 persistently stores each of the received code bundles 28 and objects 29 in the storage 46. Once installed and executing, the network service 22, now executing on the requesting system 11, will also provide a public interface 23 through which other requesting systems can also invoke the well-known methods 24 to download and update the network service software from the requesting system 11. Thus, for a network service, the network service software becomes "viral." Following successful installation and during execution of the network service 22, the requesting system 11 can become a service host system 12 capable of providing the network service software to other requesting systems 11. In a further embodiment, the network service installation software is viral. In a still further embodiment, the updating software is also viral. Other forms of propagation of the network service 22 are possible.

In the described embodiment, a client requesting system 11 discovers, obtains, installs, and updates code that allows the client system to offer a service of equivalent functionality to the network service 22 offered by the service host system 12, thus, in effect, becoming a service host system 12 itself. In a further embodiment, the code obtained by the client requesting system 11 from the service host system 12 could offer different functionality than the functionality provided by the service host system 12. For example, the obtained code could offer functionality that allows the client system to interact with the service host system. Other types of functionality are possible.

Public Interface Data Structure

FIG. 4 is a data structure diagram 60 showing, by way of example, the public interface 23 provided to a requesting client by the service host system 12 of FIG. 2. Each network service 22 provides a public interface 23 by defining the well-known methods 24. In one embodiment, the well-known methods 24 are standardized method definitions, preferably written in code in accordance with a machine-independent programming language, such as a Java programming language, for execution within the managed code platform 21 of the service host system 12. In a further embodiment, the well-known methods 24 could be written in a declarative syntax for execution independent of managed code platforms, provided, however, that each of the methods can be invoked remotely by a requesting system 11. Other forms implementations of well-known methods are possible.

By way of example, the public interface 23 consists of a tag 61 identifying the public interface, such as SpeakeasyComponent, and a set of method definitions 62 for each of the well-known methods 24. In the described embodiment, a set of four method definitions 62 is specified. When invoking each method, the requesting system 11 identifies the runtime environment, including operating system, version and patch level, and the name of the network service software as input parameters to each of the well-known methods 24.

The providesServiceInstaller method definition indicates whether the network service 22 makes available any special facilities that may need to be installed on a requesting system 12 for the network service software to be used. Special facilities include the executable network service software, as well as any constituent or dependent components. The providesServiceInstaller method definition specifies returning a Boolean value definitively indicating the availability or non-availability of the network service 22.

The verifyClientEnvironment method definition downloads a predicate object 30 with which the requesting system 11 can evaluate whether the network service software can be installed in the runtime environment of the requesting system 11. The installation predicate object 30 evaluates the runtime environment and generates a list of components that are required before the installation of the network service software can proceed.

The getServiceInstaller method definition downloads the actual installable code bundle 28, plus a helper object 31 and, optionally, an update object 32 to the requesting system 11 to install and, if necessary, update the network service software. The helper object 31 is used to delegate the installation steps to the helper mechanism 43. The update object 32 is used to check whether updates to the network service software are required.

Finally, the code UpdateRequired method definition indicates whether the network service software requires updating, such as following successful installation or on a periodic basis. Using the update object 32, the requesting system 11 can maintain a registry of version and patch level identifiers for each received code bundle 28 and can periodically check with the network service 22 to determine whether updating is required. The codeUpdateRequired method definition specifies accepting a versionDescriptor string argument that provides information about the client and returning a Boolean value definitively indicating update status.

Although described with reference to specific method definitions 62, other implementations and types of method definitions and invocations are possible. For instance, the well-known methods 24 could be invoked through a single method call 25 on the public interface 23 by specifying different parameters relative to network service availability, environment verification, installable code bundle, and updating. Similarly, the well-known methods 24 could be invoked through non-object oriented program semantics using inter-process communication mechanisms or remote procedural calls.

Routing Diagram

Figure 5:
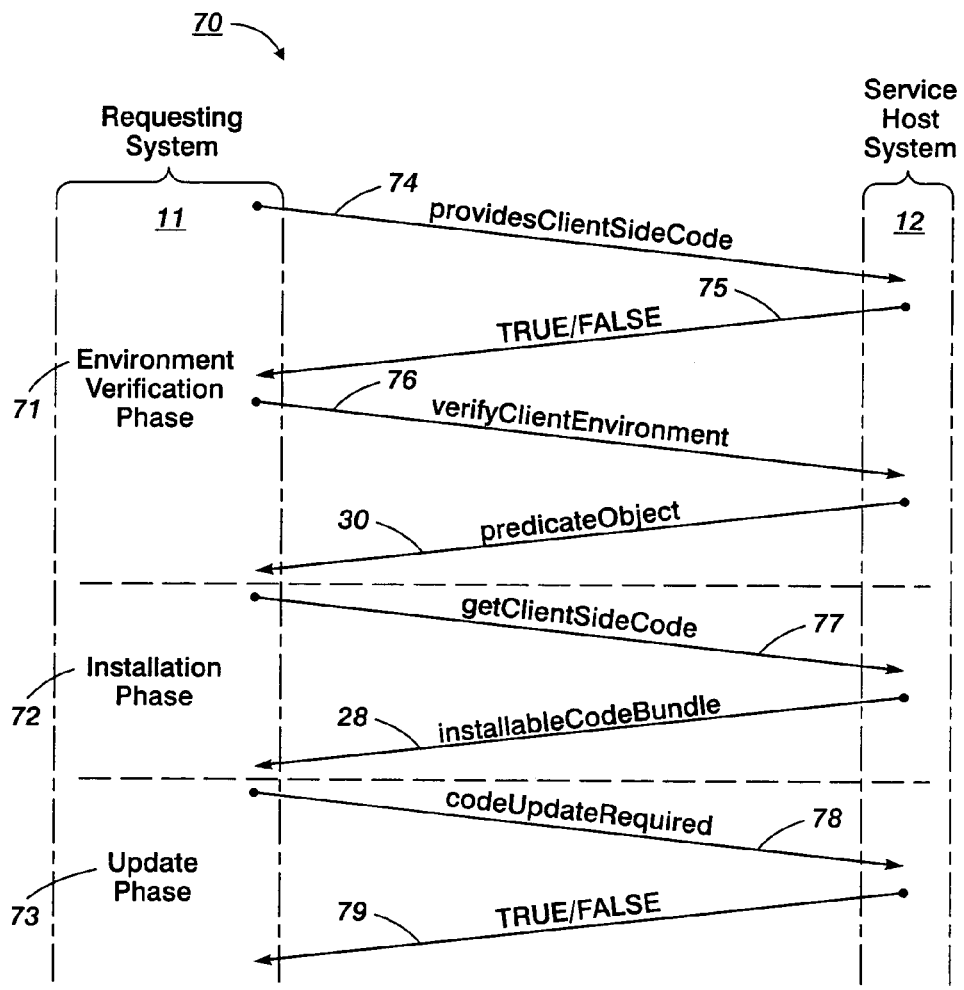
FIG. 5 is a routing diagram showing software installation processing and updating in accordance with an embodiment.

FIG. 5 is a routing diagram 70 showing software installation processing and updating in accordance with an embodiment. The requesting system 11 and service host system 12 implement a lightweight request-and-response protocol through which runtime environment verification, software installation and, if necessary, software updating, is affected.

The requesting system 11 communicates with the service host system 12 by invoking the well-known methods 24 through the method calls 25 on the public interface 23 of the service host system 12. In response, the service host system 12 sends responses 26, which can include Boolean values 44, one or more code bundles 28, and objects 29.

The protocol proceeds in three logically-defined phases. During the first phase, environment verification 71, the requesting system 11 invokes the providesServiceInstaller method 74 to determine whether the service host system 12 makes the network service software available and requires any special facilities. In response, the service host system 12 returns a Boolean value 75 indicating whether the network service software is available. If the network service software is available on the service host system 12, the requesting system 11 invokes the verifyClientEnvironment method 76 to receive a predicate object 77 with which to evaluate whether the prerequisites necessary to affecting the installation of the network service software are met. As necessary, the requesting system 11 can iteratively or recursively repeat the providesServiceInstaller method call 74 and verifyClientEnvironment method 76 on the service host system 12 or other service host system for each prerequisite until a complete set of all prerequisites is built.

During the second phase, installation 72, the requesting system 11 invokes a getServiceinstaller method call 78 on the service host system 12 to receive a code bundle 28, helper object 31 and, if necessary, update object 32 for the network service software. As necessary, the requesting system 11 can iteratively or recursively repeat the getServiceinstaller method call 77 to the service host system 12 or other service host system as required to obtain the software components necessary to install both the network service software and each of the prerequisites identified during the environment verification phase 71.

During the third phase, update 73, the requesting system 11 invokes a code UpdateRequired method call 78 to determine whether the network service software requires updating. In response, the service host system 12 returns a Boolean value 79 indicating whether an update of the network service software is required.

Other phases could also be provided, either in addition to or in lieu of the three phases 71, 72, 73. For example, environment verification, installation and updating could be performed in a one phase with a single request and single response exchanged between the requesting system 111 and the service host system 12. In addition, other forms and dialogues of protocols could be used. For instance, the requesting system 111 could pull necessary network service software from a service host system 12 without response processing.

Method Overview

Figure 6:
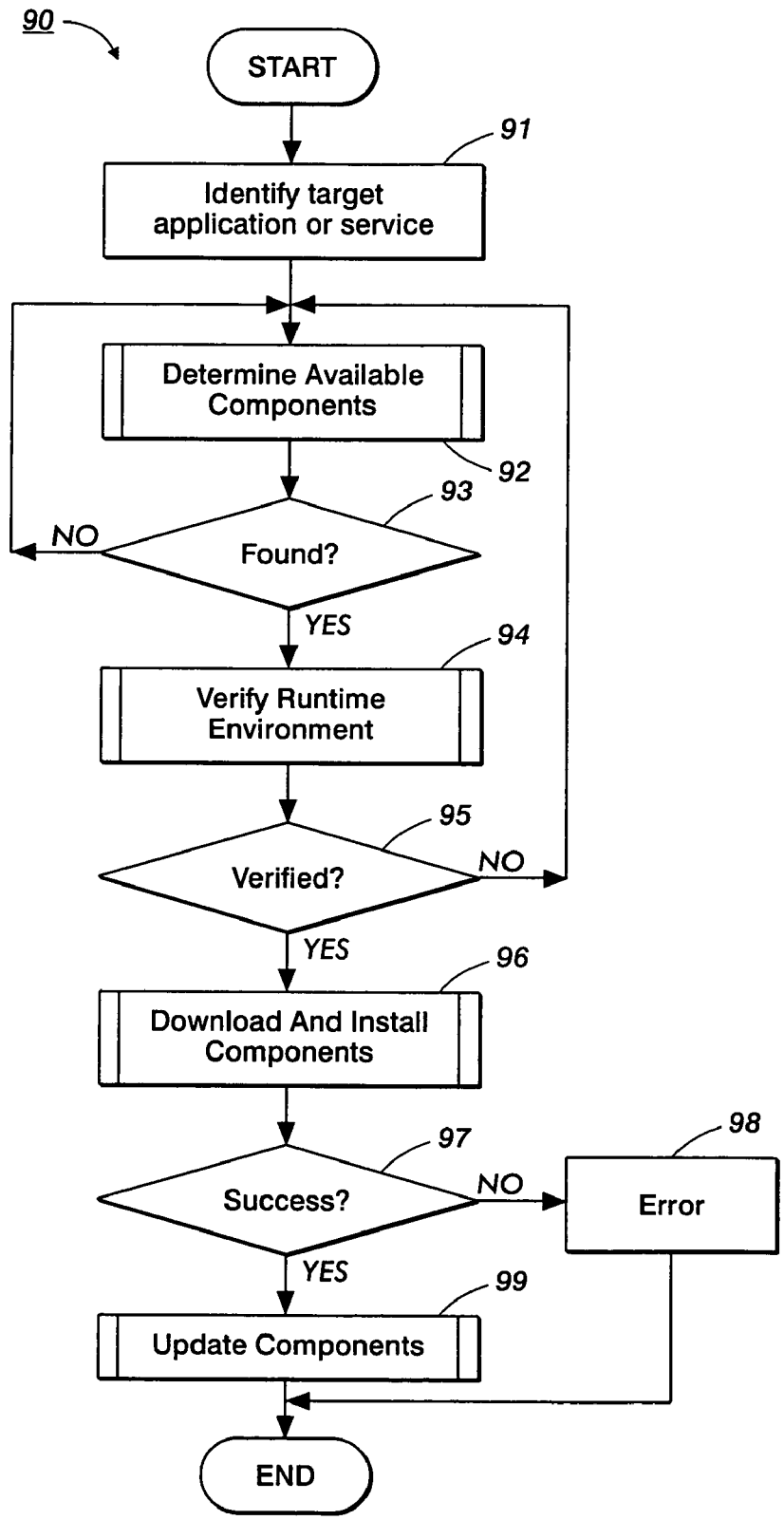
FIG. 6 is a flow diagram showing a method for providing self-installing software components for network service execution, in accordance with an embodiment.

FIG. 6 is a flow diagram showing a method 90 for providing self-installing software components, through mobile code, in accordance with an embodiment. The method 90 is described from the prospective of a requesting system 11, which transacts a lightweight request-and-response protocol dialogue with a service host system 12. The method 90 is described as a sequence of process operations or steps, which can be executed, for instance, by the requesting system 111 of FIG. 1 or other components The requesting system 11 begins by identifying a network service 22 (block 91) that is a candidate for installation. The requesting system 11 then attempts to find a service host system 12 from which to obtain the target network service 22 by determining whether the necessary components are available from a candidate service host system 12 (block 92), as further described below with reference to FIG. 7.

If the components are not found (block 93), the requesting system 11 attempts to determine whether another service host system 12 has the network service software (block 92). Otherwise, if the available components are found on the candidate service host system 12 (block 93), the requesting system 11 attempts to verify the runtime environment by executing a predicate object 30 to generate a list of components required before an installation can proceed (block 94), as further described below with reference to FIG. 8.

If the runtime environment of the requesting system 11 is not verified due to failing to meet the required prerequisites (block 95), the requesting system 11 needs to satisfy each prerequisite before installing and executing the network service 22. In one embodiment, the requesting system 11 attempts to find a service host system 12 from which to obtain the prerequisite components (block 92). The prerequisite components could be provided by the same service host system 12 from which the network service software will be obtained or could be provided by another separate source. If the runtime environment is verified successfully (block 95), the requesting system 11 downloads and installs the components for the target network service 22 (block 96), as further described below with reference to FIG. 9. In the described embodiment, the installation process can be managed explicitly by the user, who carries out the individual installation steps on the code bundle 28. Alternatively, the installation steps can be delegated to a helper object 31, which will find copies of any prerequisite software components, verify the runtime environment, and install the target network service 22 and any required prerequisites on the requesting system 11.

If the download and installation fails (block 97), an error is generated (block 98) and the method terminates. Otherwise, if successful (block 97), the software components for the target network service 22 are updated (block 99), as further described below with reference to FIG. 10. In the described embodiment, the requesting system 11 executes an update object 22, preferably periodically as an automated task, to check whether more recent versions or patches of the target network service 22 are available. Following updating, the method terminates.

Determining Available Components Routine

Figure 7:
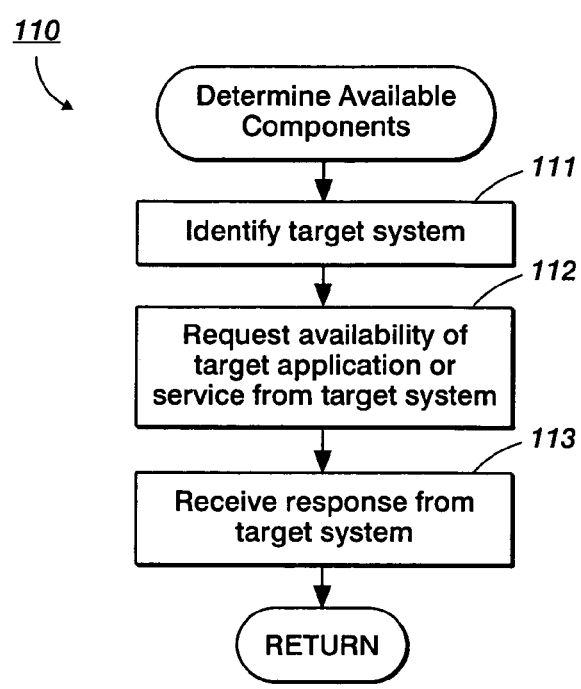
FIG. 7 is a flow diagram showing a routine for determining available self-installing software components for use in the routine of FIG. 6.

FIG. 7 is a flow diagram showing a routine 110 for determining available self-installing software components for use in the method 90 of FIG. 6. One purpose of the routine is to determine whether self-installing software components for network service are available from a candidate service host system 12.

First, the service host system 12 is identified as a candidate source for a target network service 22 (block 111). Once identified, the requesting system 11 requests the availability of the target network service 22 from the candidate service host system 12 (block 112) and receives back a response 45 indicating such availability or non-availability (block 113). In the described embodiment, the candidate service host system 12 returns a Boolean value definitively indicating availability status. The routine then returns.

Verifying Runtime Environment Routine

Figure 8:
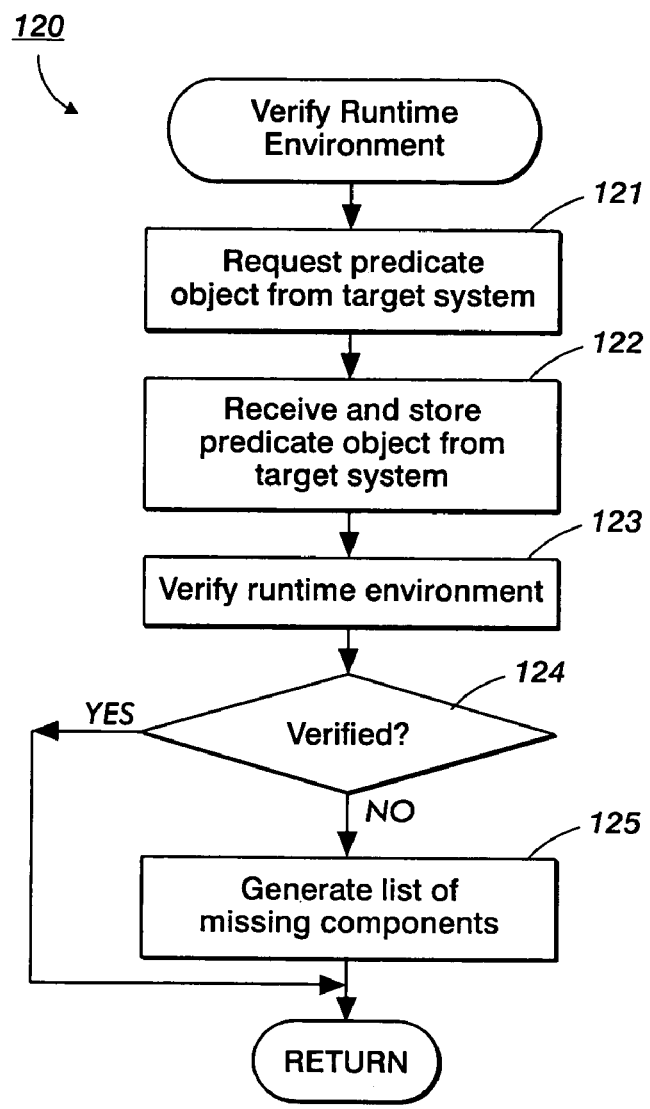
FIG. 8 is a flow diagram showing a routine for verifying a runtime environment for use in the routine of FIG. 6.

FIG. 8 is a flow diagram showing a routine 120 for verifying a runtime environment for use in the method 90 of FIG. 6. One purpose of this routine is to ensure that any prerequisites necessary to the installation and execution of the target network service 22 are satisfied.

First, the requesting system 11 requests a predicate object 30 from the service host system 12, which the requesting system 11 receives back and persistently stores (block 122). The requesting system 11 then executes the predicate object 30 to verify the runtime environment (block 123). If the runtime environment of the requesting system 11 is successfully verified (block 124), the routine returns. Otherwise, the predicate object 30 generates a list of missing components (block 125), after which the routine returns. In the described embodiment, the list of missing components is provided as a set of software components and other parameters necessary to the installation of the target network service 22.

Downloading and Installing Components Routine

Figure 9:
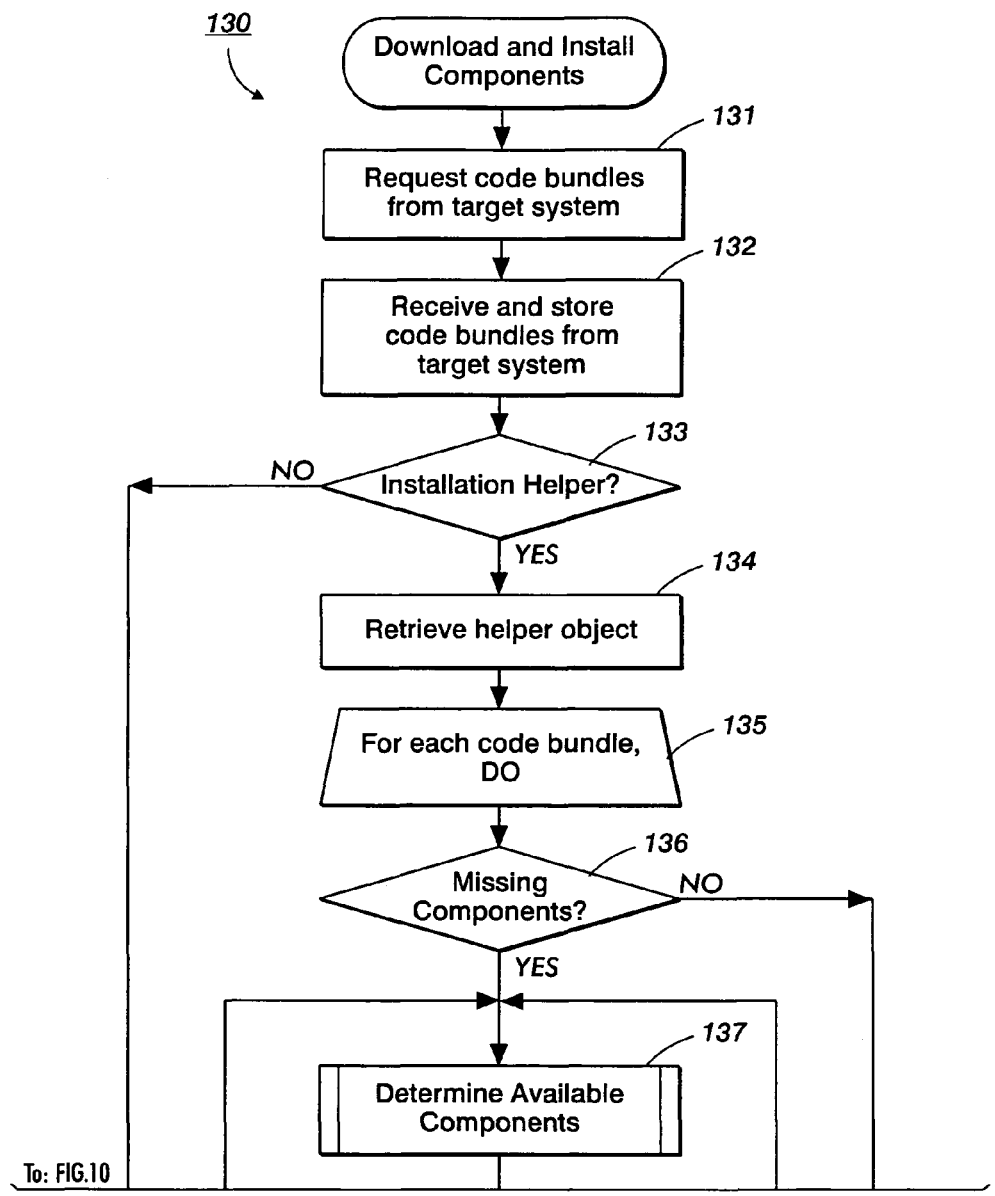
FIGS. 9 and 10 are flow diagrams showing a routine for downloading and installing self-installing software components for use in the routine of FIG. 6.
Figure 10:
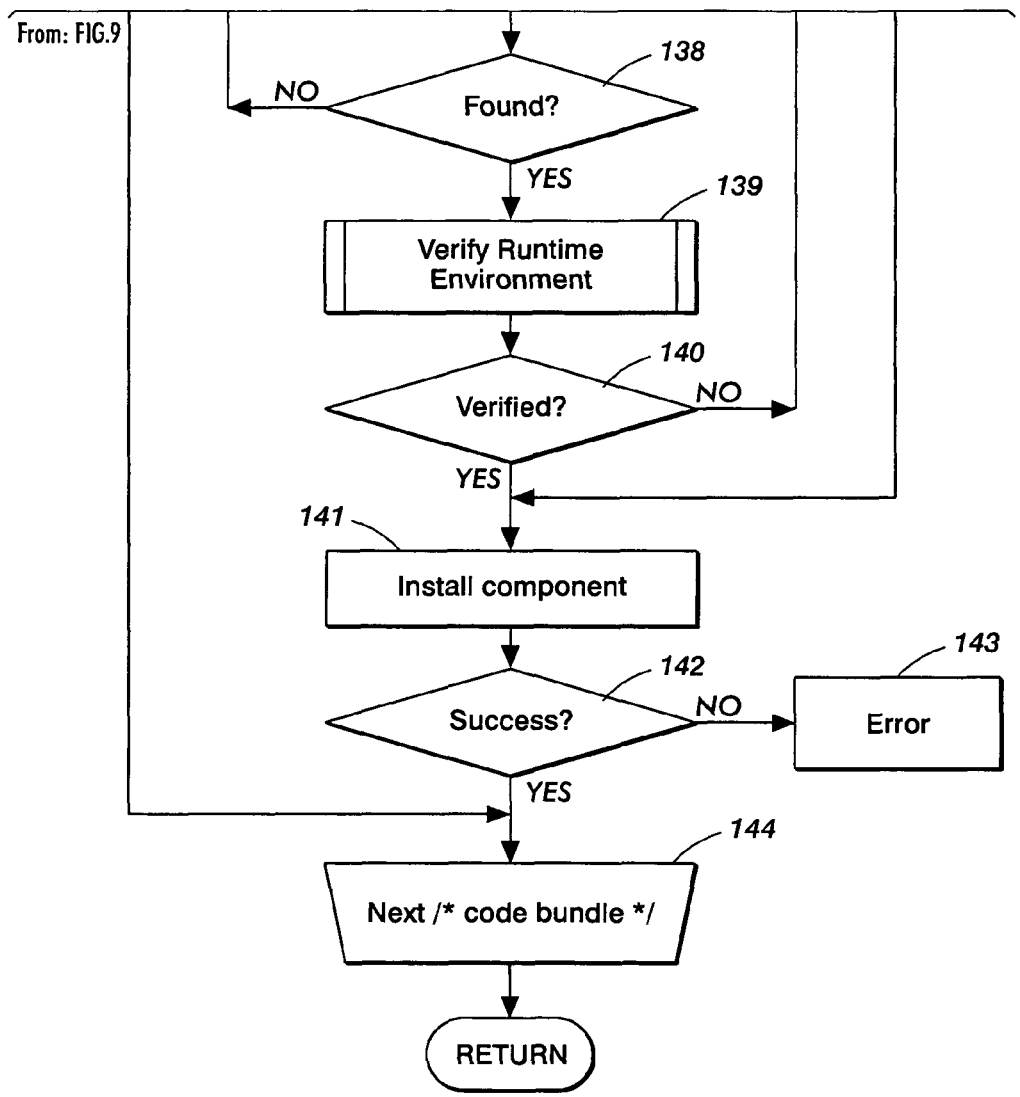

FIGS. 9 and 10 are flow diagrams showing a routine 130 for downloading and installing self-installing software components for use in the method 90 of FIG. 6. One purpose of the routine is to download any code bundles 28 required to install the target network service 22 and, if installation is delegated, to carry out the installation steps on behalf of the user.

First, the requesting system 11 requests the one or more code bundles 28 and, implicitly, the helper object 31 and, if required, update object 32, for the target network service 22 from the service host system 12 (block 131). The requesting system 11 receives and persistently stores each code bundle 28 and the helper object 31 and update object 32 (block 132). If the user chooses to manually install the software components, that is, forgoing the use of the installation helper (block 133), the routine returns and the user proceeds with manually caring out the installation steps.

Otherwise, if installation has been delegated to the helper mechanism 43 to satisfy any outstanding prerequisites and to perform the installation on behalf of the user (block 133), the helper object 31 is retrieved (block 134). Each code bundle 28 is then iteratively processed (blocks 135-144) as follows. For each code bundle (block 135), if software components are missing, that is, a list of missing software components has been generated by the predicate object 30 (block 136), the requesting system 11 determines whether the missing software components are available from the service host system 12 (block 137), as further described above with reference to FIG. 7. If the components are not available from the service host system 12 (block 138), the requesting system 11 attempts to find another service host system from which the missing software components may be available (block 137). Once the missing software components have been found (block 138), the requesting system 11 verifies the runtime environment of the requesting system 11 to evaluate whether all prerequisites necessary to the installation and execution of the target network service 22 are met (block 139), as further described above with reference to FIG. 8. If the runtime environment is not verified, that is, the predicate object 30 for the current missing software component has generated a list of additional missing software components (block 140), the requesting system 11 again attempts to determine whether the further missing software components can be found on the service host system 12 (block 137). Finally, once all missing software components are available and the runtime environment verified (block 140), the software components are installed (block 141) by executing the installation in steps specified in the predicate object 30. If the installation was not successful (block 142), an error is generated (block 143). Otherwise, if the installation is successful (block 142), processing continues with each remaining code bundle 28 (block 144), after which the routine returns.

Updating Components Routine

Figure 11:
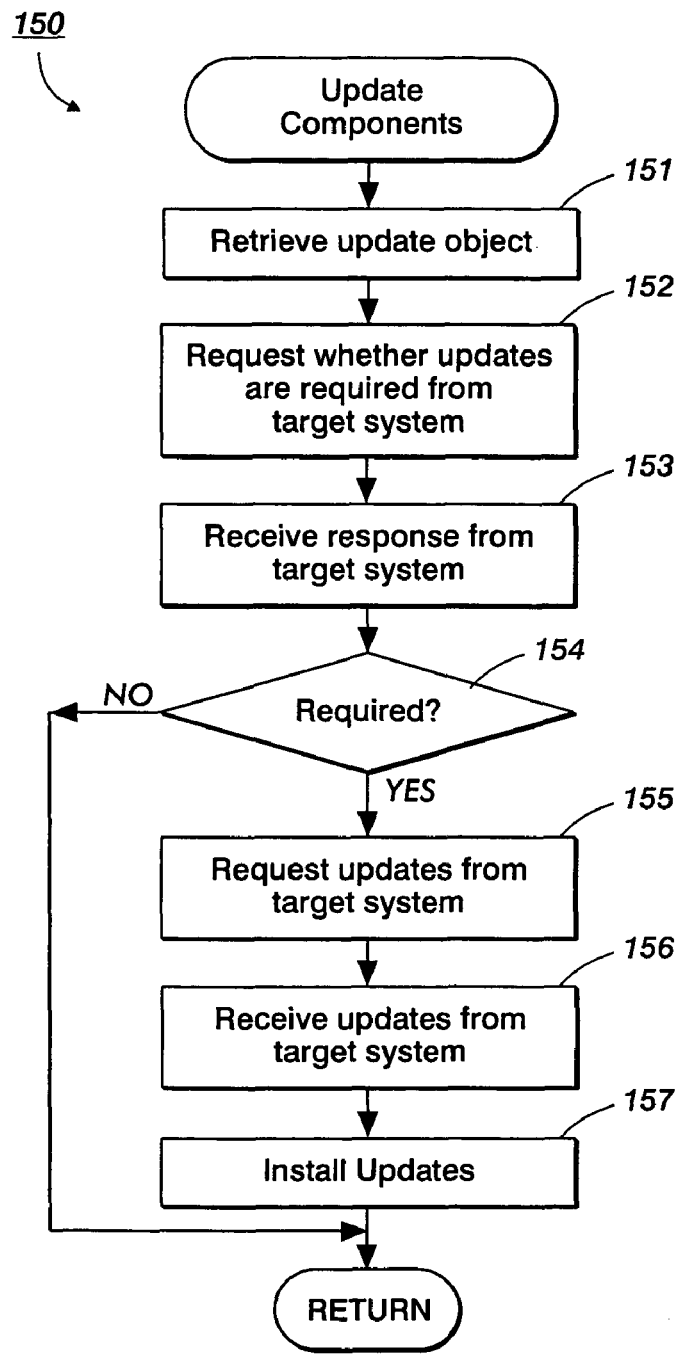
FIG. 11 is a flow diagram showing a routine for updating self-installing software components for use in the routine of FIG. 6.

FIG. 11 is a flow diagram showing a routine 150 for updating self-installing software components for use in the method 90 of FIG. 6. One purpose of this routine is to determine whether an installed target network service 22 requires updating following successful installation.

The update object 32 is retrieved (block 151) and the requesting system 11 requests whether updates are required from the service host system 12 (block 152). Upon receiving a response 26 from the service host system 12 (block 153), if updating is not required (block 154), the routine returns. Otherwise, the requesting system 11 requests any necessary updates from the service host system 12 (block 155). The requesting system 11 then receives and installs the updates (blocks 156 and 157, respectively), after which the routine returns.

In the described embodiment, a client requesting system 11 discovers, obtains, installs, and updates code that allows the client system to offer a service of equivalent functionality to the network service 22 offered by the service host system 12, thus, in effect, becoming a service host system 12 itself. In a further embodiment, the code obtained by the client requesting system 11 from the service host system 12 could offer different functionality than the functionality provided by the service host system 12. For example, the obtained code could offer functionality that allows the client system to interact with the service host system. Other types of functionality are possible.

While the invention has been particularly shown and described as referenced to the embodiments thereof, those skilled in the art will understand that the foregoing and other changes in form and detail may be made therein without departing from the spirit and scope of the invention.

What is claimed is:

1. A system for providing self-installing software components for network service execution, comprising:
   a service host system to store network service software for a service and installation software for the network service software, wherein the installation software comprises an installation predicate object and a helper object; and
   a requesting system to communicate with the service host system through a basic communication framework, comprising:
      a checking mechanism to download and execute the installation predicate object, wherein the installation predicate object comprises code to verify prerequisites against a runtime environment through the service host system by testing hardware, peripherals, and software components of the requesting system and to generate a list of missing components when at least one required component for installation of the network service software is missing;
      a helper mechanism to download and execute the helper object, wherein the helper object comprises code to obtain the at least one required component when missing and to install the network service software using the installation software; and
      a service mechanism to provide a service of equivalent functionality to the service of the service host system to one or more other requesting systems that is independent of the service host system.

2. A system according to claim 1, further comprising:
   a set of standardized method definitions provided through a public interface defined on the network service software.

3. A system according to claim 2, wherein the standardized method definitions are selected from the group comprising at least one of an availability method, environment verification method, code retrieval method, and an update method.

4. A system according to claim 1, wherein the network service software is updated through the service host system.

5. A system according to claim 1, wherein the installation predicate object verifies that the runtime environment satisfies prerequisites necessary to install and execute the network service software.

6. A system according to claim 1, wherein the installation predicate object is implemented in at least one of mobile code for execution within a managed code platform and in platform-specific native code.

7. A system according to claim 1, wherein the helper object is implemented in at least one of mobile code for execution within a managed code platform and in platform-specific native code.

8. A system according to claim 1, further comprising:
   an update object defined on the service host system to identify, retrieve and install any updates to the network service software.

9. A system according to claim 8, wherein the update object is implemented in at least one of mobile code for execution within a managed code platform and in platform-specific native code.

10. A system according to claim 1, wherein the basic communication framework comprises a Java operating environment.

11. A method for providing self-installing software components for network service execution, comprising:
   storing on a service host system, network service software for a service and installation software for the network service software, wherein the installation software comprises an installation predicate object and a helper object; and
   establishing a basic communication framework between the service host system and a requesting system, comprising:
      executing by the requesting system, the installation predicate object comprising code to verify prerequisites against a runtime environment through the service host system by testing hardware, peripherals, and software components of the requesting system and to generate a list of missing components when at least one required component for installation of the network service software is missing;
      executing by the requesting system, the helper object comprising code to obtain the at least one required component when missing and to install on the requesting system, the network service software using the installation software; and
      providing by the requesting system, a service of equivalent functionality to the service of the service host system to one or more other requesting systems that is independent of the service host system.

12. A method according to claim 11, further comprising:
   specifying a set of standardized method definitions provided through a public interface defined on the network service software.

13. A method according to claim 12, further comprising:
   defining the standardized method definitions selected from the group comprising at least one of an availability method, environment verification method, code retrieval method, and an update method.

14. A method according to claim 11, further comprising: updating the network service software through the service host system.

15. A method according to claim 11, further comprising: verifying that the runtime environment satisfies the prerequisites necessary to install and execute the network service software.

16. A method according to claim 11, wherein the installation predicate object is implemented in at least one of mobile code for execution within a managed code platform and in platform-specific native code.

17. A method according to claim 11, wherein the helper object is implemented in at least one of mobile code for execution within a managed code platform and in platform-specific native code.

18. A method according to claim 11, further comprising: defining an update object on the service host system to identify, retrieve and install any updates to the network service software.

19. A method according to claim 18, wherein the update object is implemented in at least one of mobile code for execution within a managed code platform and in platform-specific native code.

20. A method according to claim 11, wherein the basic communication framework comprises a Java operating environment.

21. A computer-readable storage medium holding code for performing the method according to claim 11.

22. An apparatus for providing self-installing software components for network service execution, comprising:
    means for storing on a service host system, network service software for a service and installation software for the network service software, wherein the installation software comprises an installation predicate object and a helper object; and
    means for establishing a basic communication framework between the service host system and a requesting system, comprising:
       means for executing by the requesting system, the installation predicate object comprising code to verify prerequisites against a runtime environment through the service host system by testing hardware, peripherals, and software components of the requesting system and to generate a list of missing components when at least one required component for installation of the network service software is missing;
       means for executing by the requesting system, the helper object comprising code to obtain the at least one required component when missing and to install on the requesting system, the network service software using the installation software; and
       means for providing by the requesting system, a service of equivalent functionality to the service of the service host system to one or more other requesting systems that is independent of the service host system.

\* \* \* \* \*